May 22, 1934. J. SNEED 1,959,692
BRAKE CONTROL
Original Filed June 18, 1928
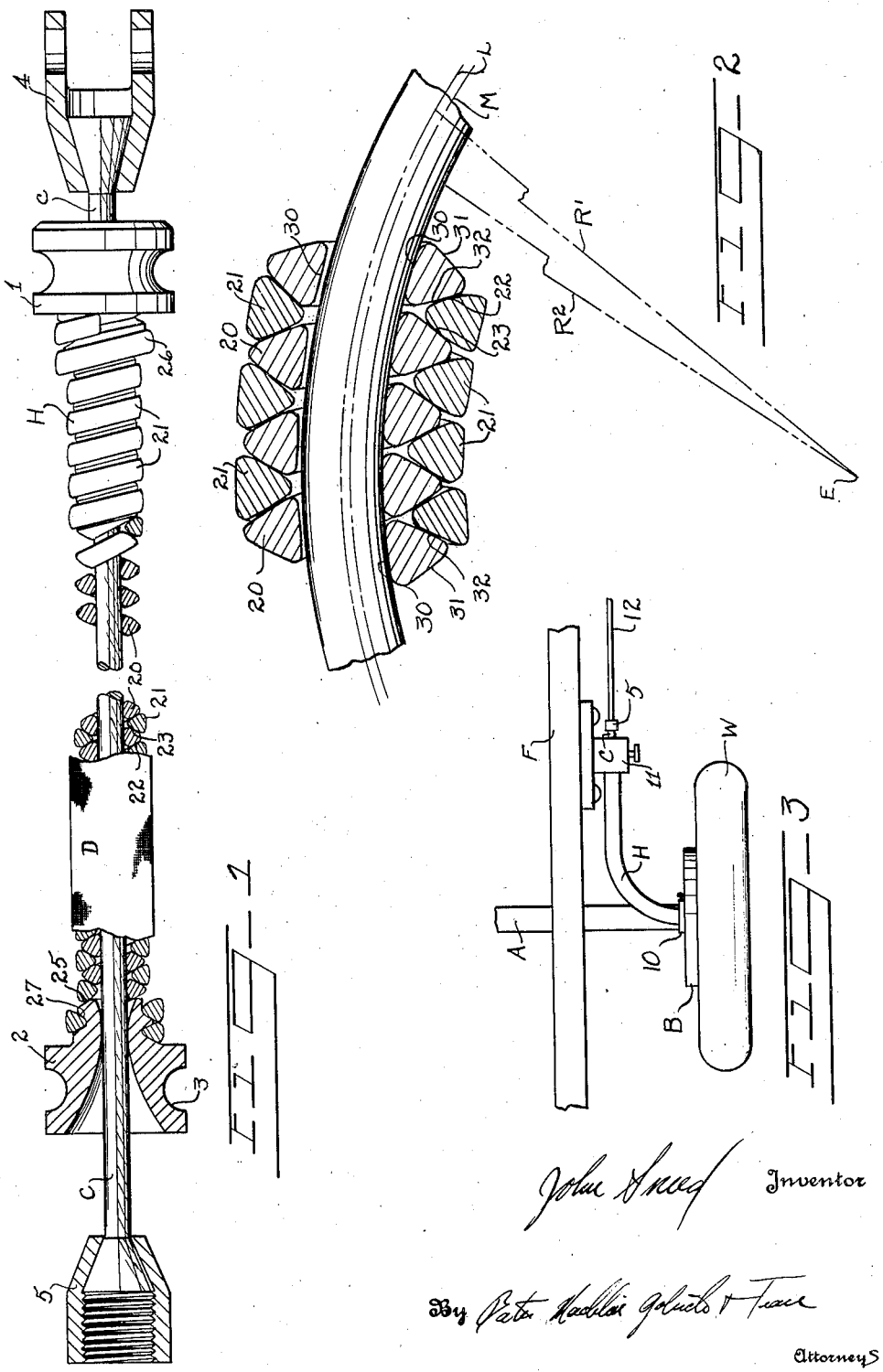

Patented May 22, 1934

1,959,692

UNITED STATES PATENT OFFICE 1,959,692

BRAKE CONTROL

John Sneed, Grosse Pointe Shores, Mich., assignor to The Midland Steel Products Company, Cleveland, Ohio, a corporation of Ohio Application June 18, 1928, Serial No. 286,153
Renewed October 21, 1933

6 Claims. (Cl. 74—39)

This invention relates to brake controls and more particularly to a flexible force transmitting device adapted for use as a brake control.

It is among the objects of my invention to provide a flexible force transmitting device which comprises a flexible tension member such as a cable and a flexible sheath or housing for the cable by means of which force and motion may be transmitted longitudinally of the device. Another object is to arrange the housing so that its length remains substantially constant during curvature. A further object is to design a housing which will support the cable in curvature along smooth and substantially continuous surfaces. A further object is to form the housing of helically wound strands, which strands are shaped to give large bearing surfaces for the cable. A further object is to arrange the strands of the housing so that certain of the strands may shift laterally with regard to others of the strands as the housing is curved. Another object is to arrange means at the ends of the housing through which it may be secured at spaced points.

Other objects will appear from the following description of a preferred form of my invention, reference being had to the accompanying drawing. The essential characteristics are summarized in the claims.

In the drawing, Fig. 1 is a partial broken longitudinal section of the device; Fig. 2 is an enlarged partial longitudinal section of the device in curvature; and Fig. 3 illustrates an embodiment of the device as a brake control.

Referring particularly to Fig. 1, I have illustrated the device as comprising primarily a cable C associated with a flexible housing H. At the ends of the housing may be secured separate end members 1 and 2, which in the embodiment shown transmit compressive loads from the housing to the parts between which the device is reacting. The end members may each have annular grooves 3 by means of which the members may be grasped in brackets or other suitable securing means. The ends of the cable may have suitable yokes or connecting members 4 and 5 through which tension loads are transmitted to the device.

Referring also to Fig. 3, I have illustrated an embodiment of my device as a brake control for one of the swiveling wheels of a motor vehicle. In this embodiment the wheel W may swivel on the axle A which supports the frame F. A brake B is illustrated as swiveling with the wheel. Associated with the brake B and carried by a non-rotating part of the brake is a bracket 10 in which by means of a set screw is secured the end member 1 of the housing. A bracket 11 is secured to the vehicle frame and by similar means grasps the end member 2 of the housing. The cable C along with the connecting member 5 extends beyond the housing as shown and is connected with a brake rod 12. Tension from the brake rod is transmitted through the cable which puts a compressive reaction on the housing and permits the transmission of force and motion from the brake rod 12 to the brake B.

Referring back to Fig. 1, the body of the housing comprises a pair of helically coiled strands 20 and 21 which form coaxial helices and are nested together and have at least helical lines of contact 22 and 23. The inner helical strand 20 may abut the ends of the end members as at 25. The outer helix spring 21 may be expanded at its ends as at 26 and may have a threaded engagement with the end members as at 27. A dust cover and lubricant container D may overlie the whole housing.

Referring also to Fig. 2, the device is shown in curvature about a center E with its center line or axis L lying in an arc defined by the radius R1. Except for the clearance between the cable and the housing, the axis or center line of the cable coincides with the arc L. The inner side of the cable defines a smaller arc which is described by the radius R2, as illustrated in Fig. 2. The inner side of the cable is supported by the strand 20. The inner surfaces 30 of the several coils of the helix 20 conform to the arc described by the radius R2 and in maximum curvature present a substantially continuous surface to the cable. The strand 20 is preferably substantially triangular in cross-section with its other surfaces 31 and 32 being equal in length and in curvature to the surface 30. Thus the walls of the strand 20 are all preferably formed to intersect the plane of curvature of the device in arcs having the radius R2. The radius R2 equals substantially the minimum radius of curvature of the device R1 less half the diameter of the cable. The plane of curvature as referred to herein is the plane determined by the center of curvature, E, and the arc of the center line L.

The helical strand 21, in the preferred form of my invention, is similar in cross-section to the strand 20, so that both strands may be wound of the same stock. As appears from the drawing, an apex of the strand 21 faces the center of the housing while the apex of the strand 20 faces outwardly. The strands 20 and 21 are nested together so that the coils of the separate strands are in intimate contact with each other whereby they mutually support and sustain each other. By this arrangement of the strands, the axes or center lines of the separate helices are coincident when the device is in straight line, but as the device is curved the axis or center line of the helix 20 lies substantially coincident with the axis or center line L of the cable while the axis or center line of the helix 21 moves toward the center of curvature as indicated at M. This lateral shifting of the helices permits the inner parts of the coils of the strand 20 to move toward each other on the side of the housing toward the center or curvature and to move apart on the side of the housing away from the center of curvature. The strands of the two helices maintain contact with each other and transmit compressive strains longitudinally of the housing while force is being transmitted.

In other words the zone of the housing on the side toward the center of curvature decreases in length when the device is curved while the zone of the housing remote from the center of curvature increases in length, because of the lateral shifting of the separate helices relative to each other. Because of this shifting of the strands and the resulting compensation, the length of cable contained within the housing is the same in curvature as in straight line position.

Those skilled in the art will appreciate the beneficial contrast between my device and such prior devices as the well known Bowden control wherein more cable is contained in the Bowden in curvature than in straight line. Where Bowden controls are attempted to be used in operating the brakes on swivelling wheels of motor vehicles, different braking effects result for different angular positions of the swivelling wheels because of the change in effective length of the Bowden housing. Using my device obviates this difficulty because a constant length of cable is always contained within the housing so that bending the housing by turning the steering wheels of the vehicle does not have the effect of tending to apply the brakes or of drawing more cable into the housing.

From the foregoing it will appear that I have provided a flexible force transmitting device which can be cheaply made and assembled, it being feasible to wind the outer strands directly upon the inner strands, or the strands may be separately wound and then screwed one within the other. Those skilled in the art will appreciate its simplicity and utility. While I have described and illustrated a preferred form of my invention and a particular application thereof, I do not care to be limited in the scope of my patent other than by the claims appended hereto.

I claim:—

1. A flexible force transmitting device comprising a cable and flexible housing therefor with which force and motion may be transmitted longitudinally, said cable being laterally supported by the housing in curvature, said housing comprising a helical strand having coils whose inner surfaces intersect the plane of curvature of the housing in arcs having a radius less than the minimum radius of curvature of the cable at least by an amount equal to the radius of the cable.

2. A flexible force transmitting device comprising a cable and flexible housing therefor with which force and motion may be transmitted longitudinally, said cable being laterally supported by the housing in curvature, said housing comprising a helical strand with spaced coils whose inner surfaces intersect the plane of curvature of the housing in arcs having a radius less than the radius of curvature of the cable by an amount equal to the radius of the cable, and means for spacing said coils which permit the portions of the coils toward the center of curvature to move toward each other as the device is curved.

3. A flexible force transmitting device comprising in combination a cable and a flexible housing for laterally supporting said cable, said housing comprising a coiled strand substantially triangular in cross section with the base of the triangle facing the cable, the base of the triangle being convex and having a radius equal to the minimum radius of curvature of the device less substantially the radius of the cable.

4. A flexible force transmitting device comprising in combination a cable, a flexible housing for the cable through which the cable may be drawn and which laterally supports the cable at least in curvature, said housing comprising a coiled strand substantially triangular in section with its base engaging the cable, said base conforming to the convex arc having a radius equal to the minimum radius of curvature of the device less the radius of the cable, and means for spacing adjacent portions of the coils apart equal distances when the device is in straight line and unequal distances when the device is in curvature.

5. A flexible force transmitting device comprising in combination a cable, a flexible housing for the cable through which the cable may be drawn and which laterally supports the cable at least in curvature, said housing comprising a coiled strand substantially triangular in section with its base engaging the cable, said base conforming to a convex arc having a radius equal to the minimum radius of curvature of the center line of the device less the radius of the cable, and means comprising a larger coiled strand similar in cross section to the first strand for spacing the coils of the first strand apart equal distances when the device is in straight line and unequal distances when the device is in curvature.

6. A flexible force transmitting device comprising in combination a cable and a flexible housing for laterally supporting the cable, said housing comprising an inner and outer coil spring of which the cross sections of the strands are equiangular triangles with convex curved sides wherein the curves of the sides are of like radii and equal to the least radius of curvature of the inner side of the cable, the inner of said springs supporting the cable along said curved sides, the outer of said springs having an apex of its coils directed inwardly between the coils of the inner spring and the coils contracting along helical lines the axis or center line of which lines of contact shift as the device is curved.

JOHN SNEED.